Figure 1:
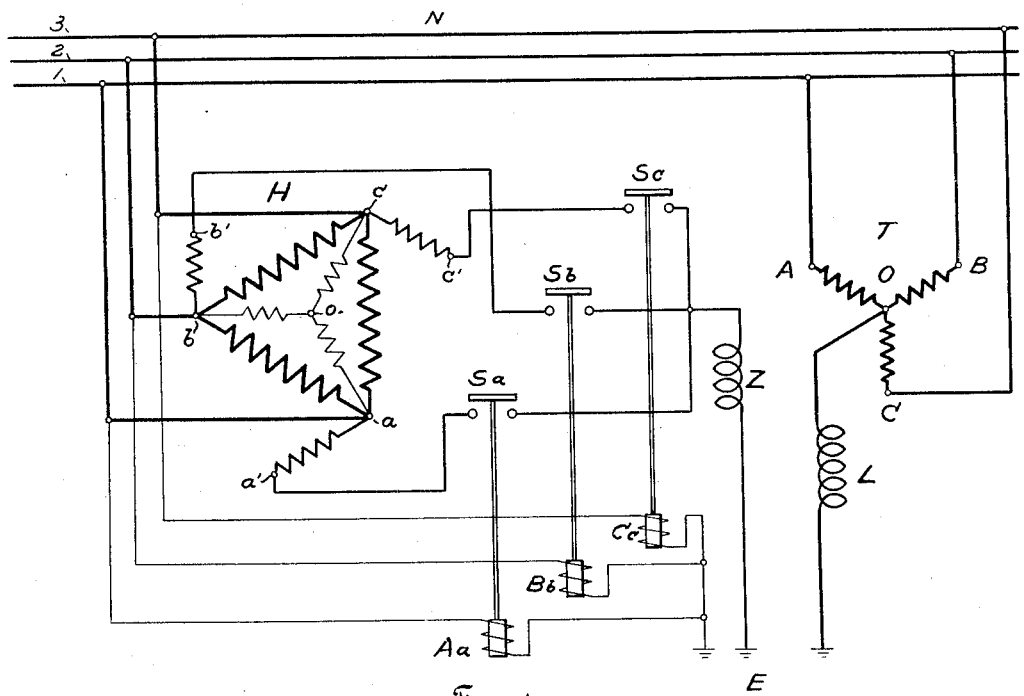

Oct. 31, 1933.   J. JONAS   1,932,973

MEANS FOR SUPPRESSING GROUND CURRENTS IN POLYPHASE HIGH VOLTAGE NETWORKS

Filed Feb. 6, 1931

Inventor
Julius Jonas
by Alfred N. Dyson
Attorney

Patented Oct. 31, 1933

1,932,973

UNITED STATES PATENT OFFICE 1,932,973

MEANS FOR SUPPRESSING GROUND CURRENTS IN POLYPHASE HIGH VOLTAGE NETWORKS

Julius Jonas, Baden, Switzerland, assignor to Aktiengesellschaft Brown Boveri & Cie., Baden, Switzerland, a joint-stock company of Switzerland Application February 6, 1931, Serial No. 514,026, and in Germany February 7, 1930

6 Claims. (Cl. 172—237)

This invention relates in general to protective systems and more particularly to ground arc extinguishing systems for high-tension transmission lines.

An object of this invention is to provide apparatus that will neutralize not only the reactive component of ground fault current in a transmission line, but also the active or watt-component of such current.

Another object of this invention is to provide a translating device having windings for producing phase displaced emfs which cause compensating currents to flow in a transmission conductor having a ground fault thereon.

In order completely to compensate the current to earth in a polyphase high tension network utilizing inductive earth leakage protective means (such as shown in U. S. Patents to Peterson, No. 1,537,371, May 12, 1925, or to Jonas, No. 1,647,869, November 1, 1927) it is necessary to balance, besides the capacity component of the current to earth, the active or power component of this current as well. While it is possible with the known extinguishing arrangements to compensate the capacity component of the current to earth by symmetrically connected inductances having a straight voltage characteristic, special measures have to be adopted for balancing the active component, because, in the case of a ground fault, the earth inductance is excited by a voltage, the vector of which is displaced in the lagging sense with respect to the vector of the phase voltage of the earthed conductor of the network or, in other words, the inductance is excited by a current, the vector of which is displaced in the lagging sense by more than 90° with respect to the vector of the phase voltage of the earthed conductor of the network.

In German Patent No. 441,121 for instance, a number of inductances corresponding to the phase number of the network is interposed between the earth and symmetrically located points of a winding system connected to the network, the position of the connecting points being such that the star voltages corresponding to them are neither in phase nor in counter-phase with the phase voltages of the network. In order, however, to bring the resulting compensating current flowing in these inductances exactly into counter-phase with respect to the current to earth, the inductances were made such that the coil connected in the case of an earth to what happens to be the highest voltage is in the condition in which the iron is highly saturated, while the coils connected to the lower voltages still have their iron cores unsaturated. The compensating current is in this case mainly produced by that voltage which excites the most highly saturated inductance and this voltage is displaced in the lagging sense by an angle with respect to the voltage of the phase which happens to be earthed. Hence the resultant current in the earthing inductance is phase-displaced by more than 90° with respect to the phase voltage of the earthed conductor of the network. The adoption of a high degree of saturation of the iron has the disadvantage, however, that the inductive compensating current has strongly marked higher harmonics (more particularly third harmonics) so that the advantage of the full compensation of the fundamental harmonic current to earth is counterbalanced by the occurrence of strongly marked higher harmonics.

The complete compensation of the current to earth could also be realized by using an unsaturated earthing inductance and connecting the same in the case of a ground fault directly to a voltage of the given winding system, which lags with respect to the voltage of the grounded conductor. This arrangement has the disadvantage, however, that in certain circumstances the earth leakage protective device may operate too late, as the selection of the point of connection for the extinguishing inductance must in each case depend on the phase of the earthed conductor of the network. For this reason the protective device can only become effective when selectively acting arrangements have established the connection mechanically after the occurrence of the leakage to earth. There is the further disadvantage due to the fact that the whole inductance must be switched in and out. This necessitates the provision of switching devices for the full current to earth, which frequently has a considerable value.

In order to avoid the switching in and out of the whole extinguishing inductance it might be kept permanently connected in the hitherto usual manner as a bus bar earthing coil, a neutral point choking coil or an extinguishing transformer (neutral compensator) and in the case of an earth an additional voltage might be connected up in its circuit, which brings the current flowing in the extinguishing device exactly into counter-phase with respect to the current to earth. The introduction of such an additional voltage, however, in the circuit already carrying current owing to the leakage to earth cannot take place entirely without disturbance, as it is not possible when introducing the additional voltage to prevent a temporary choking of the current, or a short-circuit of parts of the winding, or even a temporary interruption of the current.

These disadvantages may be overcome according to the present invention by balancing the residual active current in a separate additional inductance, one terminal of which is earthed and which, on a ground fault occurring, is connected to a voltage which produces in it a current, the vector of which is displaced in the lagging sense by more than 90° with respect to the vector of the conductor to ground voltage of the earthed conductor of the network. Should the auxiliary voltage lag by 90° with respect to the conductor to ground voltage of the earthed conductor of the network, then the component, flowing through the additional winding, of the total inductive extinguishing current will be displaced by approximately 90° with respect to the current of the main inductance. In this case the main inductance may be designed as hitherto for compensating as completely as possible the capacity component of the current to earth, without regard to the additional inductance which compensates the residual active current. In already existing high tension networks which are protected by inductive earthing against the consequences of the leakage to earth, the residual active current can even be subsequently compensated by connecting the correspondingly excited additional inductance to a suitable point of the network. For this purpose an auxiliary transformer is usually required which is connected to the high tension network and which supplies the auxiliary voltage required for exciting the auxiliary inductance with a current lagging with respect to the conductor to ground voltage of the earthed conductor of the network. Relays are also required, which selectively connect the additional inductance to the correct phase conductor in each case in dependence on the voltages of the network conductors with respect to earth. As the additional inductance has to be designed only for the residual active current and the latter amounts to only a few percent of the current to earth, the auxiliary transformer and the additional inductance need only be designed for a few percent of the power consumed by the leakage.

Figure 2:
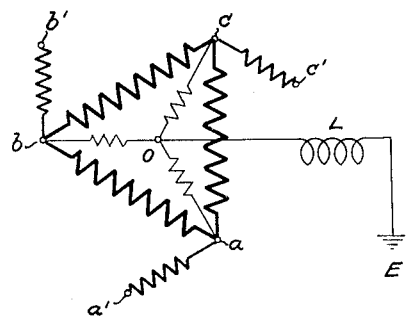

The whole arrangement thus only represents a relatively small additional apparatus to the normal extinguishing arrangements. The main inductance may of course be connected to the auxiliary transformer as shown in Fig. 2, for instance, noting that a neutral point choking coil Z (extinguishing coil) may be connected to the star point O of the auxiliary transformer winding, but in this case the auxiliary transformer must be designed in accordance with the total current flowing through it. As in normal operating conditions, that is, with a sound network, the current in the auxiliary transformer is very small, the latter is out of use during by far the greater part of the period of operation. It may, however, also be used for compensating the charging current of the network, if it is provided with large air gaps. The auxiliary transformer when thus used will absorb a large magnetizing current, which compensates the leading charging current of the net work and thereby relieves the generators at the central station from supplying these currents. In the case of an earth, the compensating currents are added geometrically to this magnetizing current and the cross-sectional areas of the conductors must be designed to carry this total current. The additional inductance may be connected to any point of the high tension network. It may, however, also be divided up into part inductances which must be distributed over the network in such a manner that each part of the network that can be controlled separately has a corresponding part inductance apportioned to it. For selectively switching the additional inductance on and off no-voltage relays are preferably used, which are interposed between the network conductors and earth, the relay of the network phase in which the earth has occurred connecting the additional inductance to the corresponding winding point of the auxiliary transformer. The switches themselves are preferably quick-acting switches, in order that the compensation of the current to earth shall reach its full value in the shortest possible time.

Instead of using an auxiliary transformer, the transformer or generator for connecting up the main inductance may also be provided with additional windings for connecting up the additional inductance.

These and other objects and advantages are obtained by this invention, various novel features of which will be apparent from the description and drawing herein, and will be more particularly pointed out in the claims.

Various illustrative examples of the application of this invention are shown in the accompanying drawing in which:

Fig. 1 shows a ground current extinguishing system embodying the present invention, Fig. 2 shows a modified form of phasing device which eliminates the neutral establishing device T.

Referring now to Fig. 1, N is a three-phase high tension network, with three conductors 1, 2 and 3. H is an auxiliary transformer for connecting the additional inductance Z, one pole of which is connected to earth E. The auxiliary transformer H has a winding $a$, $a'$, $b$, $b'$, $c$, $c'$, the terminals $a$, $b$, $c$ of which are connected to the high tension network N, while the terminals $a'$, $b'$, $c'$ are connected to the left hand contacts of the quick-acting switches $S_a$, $S_b$, $S_c$. The right hand contacts of these three switches are connected together and to the free terminal of the additional inductance. The quick-acting switches are selectively operated by the no-voltage relays $A_a$, $B_b$, $C_c$, associated with them. If, for instance the network conductor 3 has a leakage to earth, the terminal c of the winding H will be at the earth potential and the no-voltage relay $C_c$ will be without voltage and close the switch $S_c$, while the switches $S_a$ and $S_b$ will remain open. The additional inductance Z is then connected to the terminal c and will be subject to the voltage prevailing between the terminals c and $c'$, which voltage as will be seen from Figure I, is at right angles to the voltage o c, which represents the conductor to ground voltage of the earthed network conductor. The current flowing through the additional inductance Z is therefore displaced through almost 180° with respect to the voltage o, c, and is therefore in counter-phase with respect to the residual active current of the network. As a means for balancing the capacity component of the current to earth, the extinguishing coil L is shown in Fig. 1 of the drawing in which coil L is connected to the star point O of the winding A, B, C of the transformer T. If the transformer H is suitably designed as to inductive reactance and current carrying capacity the extinguishing coil L may also be connected to the star point o of this transformer as shown in Fig. 2. If the devices are arranged separately, it is not necessary for them to be placed close together, they may be independent of one another and be disposed at any points of the network.

It is claimed and desired to secure by Letters Patent:

1. In a protective system including a multi-conductor alternating-current transmission line having a neutral point, and an inductance connected between said neutral point and ground for neutralizing the reactive component of ground fault currents, the combination of a second inductance, a phasing device energized from said line, and means responsive to the grounding of a conductor of said line for so connecting said second inductance to said grounded conductor through a portion of said phasing device that the power component of said ground fault current is neutralized.

2. In a protective system having a multi-conductor alternating-current transmission line with an inductance connected between a neutral point of said line and ground for neutralizing the reactive component of current due to a ground fault on one conductor of said line, the combination of an alternating current translating device having windings for producing emfs in quadrature to the conductor to ground voltages of said line, and means responsive to the occurrence of a ground fault on one conductor of said line for impressing one of said emfs between the conductor having said ground fault and ground for neutralizing the watt-component of the ground fault current.

3. In a protective system having a multi-conductor alternating current transmission line with an inductance connected between a neutral point of said line and ground for reducing the reactive component of current due to a ground fault on one conductor of said line, the combination of a second inductance, a phasing device energized from said line and provided with phase displaced windings, relays responsive to the voltages between the conductor of said line and ground for selectively connecting said second inductance and one of said phase displaced windings serially between ground and one of the conductors of said line upon occurrence of a ground fault on said one of the conductors of said line.

4. In a protective system having a multi-conductor alternating-current transmission line with an inductance connected between a neutral point of said line and ground for neutralizing the reactive component of current due to a ground fault on one conductor of said line, the combination of a transformer energized from said line and provided with phase displaced windings each having an end thereof connected at one end to the respective conductors of said line, means including relays responsive to the drop in voltage between the respective conductors and ground for selectively connecting the other end of one of said windings to ground upon occurrence of a ground fault in the conductor to which said one of said windings is connected for the purpose of neutralizing the active component of the ground fault current.

5. A protective system comprising, a multi-conductor alternating-current transmission line having capacitance to ground, an alternating current translating device having a neutral point, an inductance connected between said neutral point and ground for neutralizing the capacity component of fault current due to the grounding of one conductor of said line, said translating device also having a plurality of windings for producing emfs displaced in phase relative to the voltage between the conductors of said line and ground, a second inductance, and means responsive to the grounding of one conductor for causing one of said emfs to be impressed between one conductor of said line and ground through said second inductance to neutralize the active component of fault current flowing in said grounded conductor.

6. In a protective system the combination of a transmission line, a translating device connected to said line and provided with a dephased winding for producing an emf displaced in phase relative to the voltage between the conductors of said line and ground, means for minimizing the flow of the power component of ground fault current comprising a no-voltage relay for connecting said dephased winding between a conductor of said line and ground when a ground fault occurs on said conductor of said line.

JULIUS JONAS.